(12) United States Patent
Numata

(10) Patent No.: US 6,417,889 B1
(45) Date of Patent: Jul. 9, 2002

(54) PICTURE SIZE CONVERSION METHOD AND DEVICE THEREOF

(75) Inventor: Kohji Numata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/203,757

(22) Filed: Dec. 2, 1998

(30) Foreign Application Priority Data

Dec. 2, 1997 (JP) ............................................ 9-347044

(51) Int. Cl.$^7$ .............................. H04N 9/74; H04N 7/01
(52) U.S. Cl. ........................ 348/581; 348/458; 345/670
(58) Field of Search ................................ 348/581, 580, 348/583, 458, 447, 445, 441, 443, 565–568, 704; 345/670, 668; 382/298, 299; H04N 9/74, 11/20, 7/01

(56) References Cited

U.S. PATENT DOCUMENTS

| | | | | |
|---|---|---|---|---|
| 4,163,249 A | * | 7/1979 | Michael et al. | 348/580 |
| 4,454,506 A | * | 6/1984 | Netravali et al. | 345/589 |
| 5,025,315 A | * | 6/1991 | Johary et al. | 348/441 |
| 5,473,382 A | * | 12/1995 | Nohmi et al. | 348/441 |
| 5,488,389 A | * | 1/1996 | Nakanishi et al. | 345/531 |
| 6,141,061 A | * | 10/2000 | Takeuchi | 345/670 |

FOREIGN PATENT DOCUMENTS

| | | |
|---|---|---|
| JP | 64-51774 | 2/1989 |
| JP | 2-33282 | 2/1990 |
| JP | 2-254883 | 10/1990 |
| JP | 5-284422 | 10/1993 |
| JP | 5-292393 | 11/1993 |
| JP | 6-86236 | 3/1994 |
| JP | 6-205293 | 7/1994 |
| JP | 9-130675 | 5/1997 |
| JP | 9-219820 | 8/1997 |
| JP | 10-304396 | 11/1998 |

* cited by examiner

Primary Examiner—Michael H. Lee
(74) Attorney, Agent, or Firm—Foley & Lardner

(57) ABSTRACT

A picture size conversion method (and device) is provided to avoid deterioration of picture display quality such as a blur and distortion, especially with respect to motion pictures which are displayed in accordance with an interlaced display method. Herein, a size conversion table storing display flags is created in accordance with a reduction ratio, wherein each of the display flags represents a decision whether to allow display with respect to each of horizontal lines. At first, the method discriminates whether the reduction ratio (R) belongs to a first range ($0<R<½$) or a second range ($½≦R<1$), while the method also discriminates whether each of horizontal lines belongs to an even-numbered field or an odd-numbered field within one frame. In the case of the first range of the reduction ratio, the method thins out all of horizontal lines belonging to the even-numbered field while selectively thinning out horizontal lines belonging to the odd-numbered field with reference to the size conversion table. In the case of the second range of the reduction ratio, the method does not at all thin out the horizontal lines of the even-numbered field while selectively thinning out the horizontal lines of the odd-numbered field with reference to the size conversion table. Thus, original pictures can be converted (or reduced) in sizes in different ways in response to the first range and second range of the reduction ratio respectively.

28 Claims, 14 Drawing Sheets

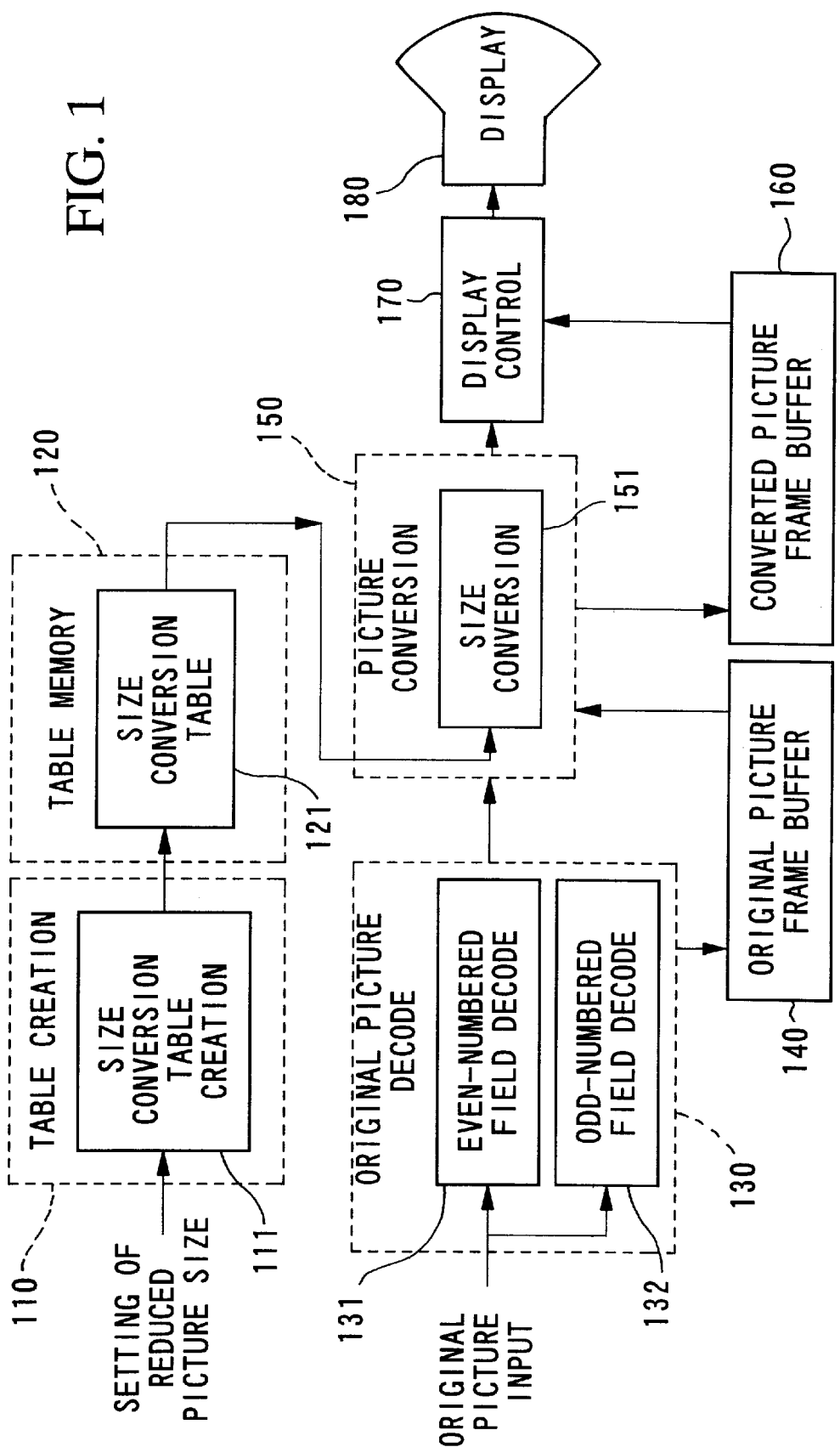

FIG. 2A

| POINTER VALUE | DISPLAY FLAG |
|---|---|
| 1 | 1 |
| 2 | 0 |
| 3 | 0 |
| 4 | 0 |
| 5 | 1 |
| 6 | 0 |
| 7 | 0 |
| ⋮ | ⋮ |

FIG. 2B

| POINTER VALUE | DISPLAY FLAG |
|---|---|
| 1 | 1 |
| 2 | 1 |
| 3 | 1 |
| 4 | 0 |
| 5 | 1 |
| 6 | 1 |
| 7 | 1 |
| ⋮ | ⋮ |

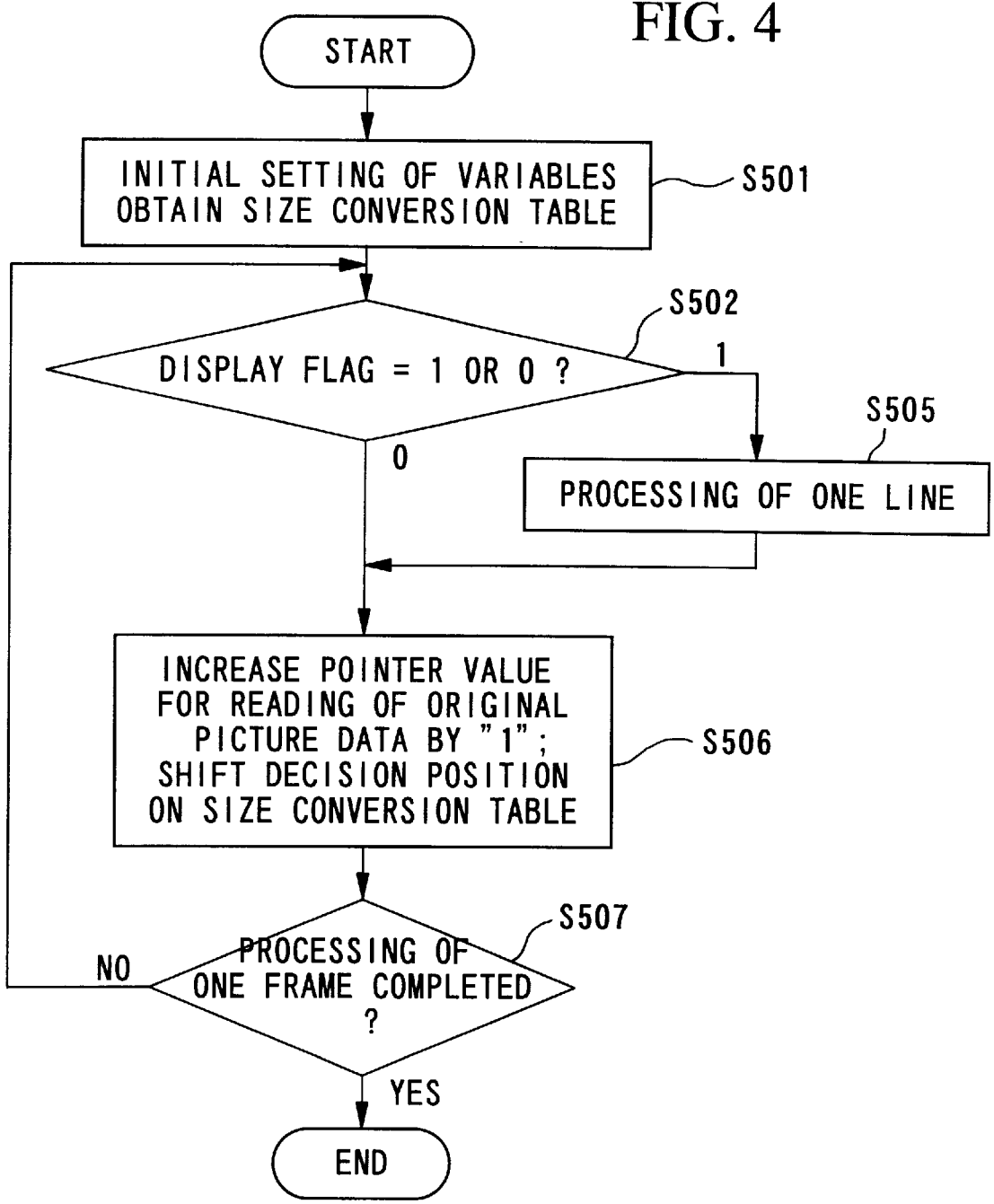

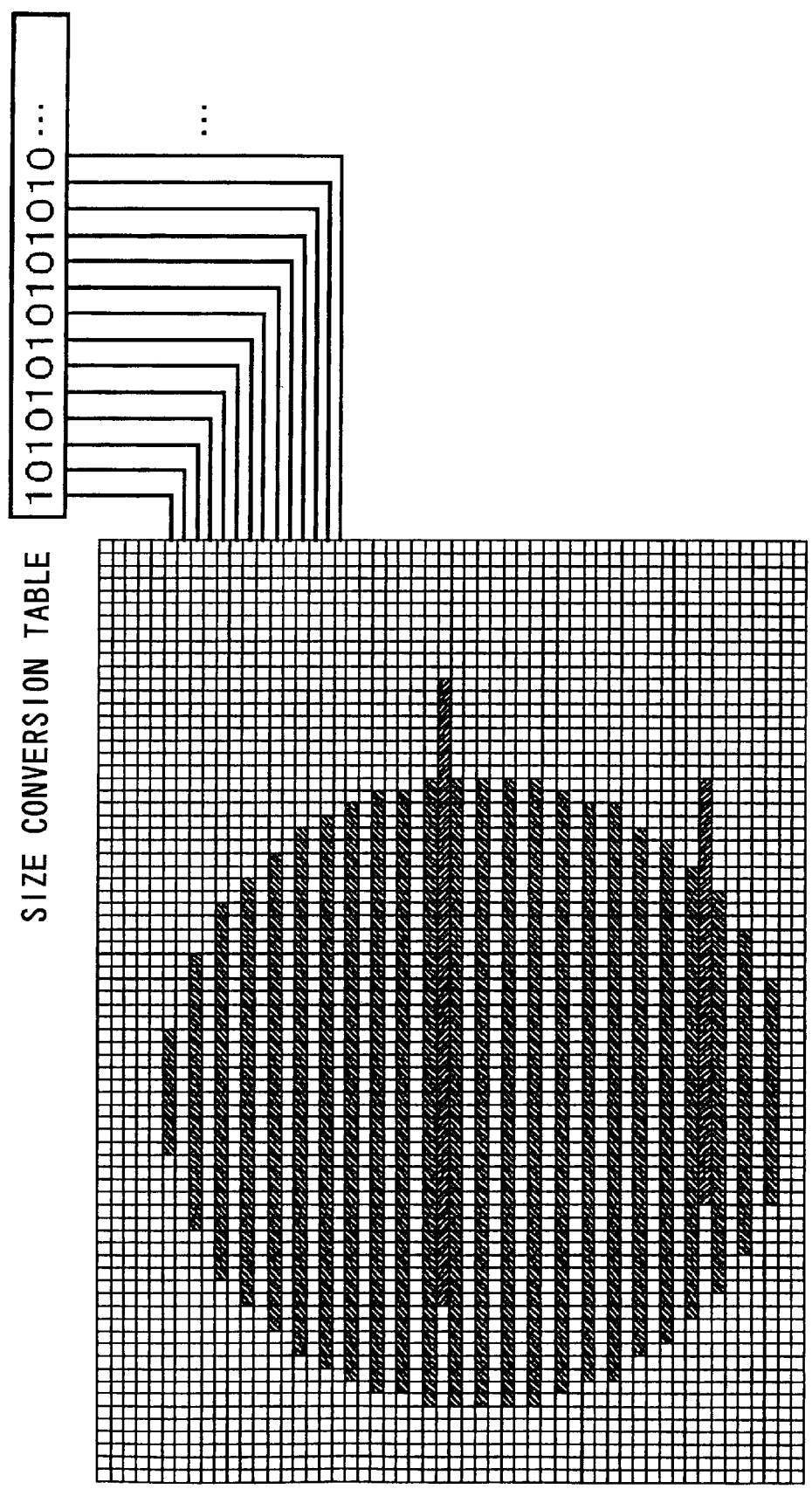

FIG. 9

| POINTER VALUE | CORRECTION FLAG VALUE |
|---|---|
| 1 | 0 |
| 2 | 1 |
| 3 | 0 |
| 4 | 0 |
| 5 | 0 |
| 6 | 1 |
| 7 | 0 |
| ⋮ | ⋮ |

PICTURE SIZE CONVERSION METHOD AND DEVICE THEREOF

BACKGROUND OF THE INVENTION

1. Field of the Invention

This invention relates to picture size conversion methods and devices that convert pictures in sizes, especially motion pictures, which are displayed on screens of image display systems such as television receivers.

This application is based on Patent Application No. Hei 9-347044 filed in Japan, the content of which is incorporated herein by reference.

2. Description of the Related Art

Conventionally, there are provided a variety of technologies for picture display methods and picture-size reduced display methods.

For example, Japanese Patent Application, Publication No. Sho 64-51774 discloses the technology that thins out picture data in response to a denominator of a fraction of a reduction ratio, which is an even number or an odd number, with respect to each of odd-numbered fields and even-numbered fields. However, this technology cannot achieve the reduction ratio which is designated arbitrarily.

Japanese Patent Application, Publication No. Hei 2-254883 discloses the technology that displays vertically reduced pictures, which are reduced in sizes in a vertical direction of the screen, by reducing a horizontal scanning period to ½ of the normal one. However, this technology requires a increased number of scanning lines, which is increased double as compared with a normal number of scanning lines.

Japanese Patent Application, Publication No. Hei 2-33282 discloses the technology regarding the television signal processing system that is capable of performing multiplex transmission on a plenty of information within the predetermined frequency band. This publication merely proposes a method to effectively improve existing television signals. So, it lacks description regarding compression of picture sizes.

Japanese Patent Application, Publication No. Hei 5-284422 discloses the technology to solve the problem due to the time difference between two fields by delaying the odd-numbered field or even-numbered field by one horizontal scanning period. However, this technology has a problem that the delay circuit is complicated in configuration.

Japanese Patent Application, Publication No. Hei 6-86236 discloses the technology to convert analog interlaced scanning signals to analog sequential scanning signals.

Japanese Patent Application, Publication No. Hei 9-130675 discloses the technology to simultaneously display a plenty of reduced pictures on the screen. According to this technology, pseudo frame signals are produced based on video signals belonging to one field, so that resolution is maintained at a reduced picture display mode.

Japanese Patent Application, Publication No. Hei 9-219820 discloses the technology that by using the algorithm to designate lines which are thinned out, thin-out operations are performed with respect to both of the odd-numbered fields and even-numbered fields in such a way that the thinned lines are uniformly arranged.

Moreover, Japanese Patent Application No. Hei 9-106017 (which is filed in U.S. as well as Ser. No. 09/060,560) discloses an example of a motion picture size reduction device. FIG. 13 shows a configuration of the aforementioned motion picture size reduction device.

The motion picture size reduction device of FIG. 13 is configured by a size conversion table creation block 1001, a size conversion table memory 1002, a compressed picture decode block 1003, an original picture frame buffer 1004, a size color conversion block 1005, a converted picture frame buffer 1006, a display control block 1007 and a display unit 1008.

In the motion picture size reduction device of FIG. 13, the compressed picture decode block 1003 converts input original pictures of field form to original pictures of frame form, which are then stored in the original picture frame buffer 1004. If the original pictures of the frame form are subjected to display without being reduced in sizes, they are subjected to conversion made by the size color conversion block 1005, so that converted pictures are stored in the converted picture frame buffer 1006. Then, the display control block 1007 reads the converted pictures, stored in the converted picture frame buffer 1006, to display them on the screen of the display unit 1008.

If the input original pictures are subjected to reduction, a reduced size is designated, so that the size conversion table creation block 1001 creates a size conversion table, which is then stored in the size conversion table memory 1002. At this time, a reduction mode is designated as well. The size color conversion block 1005 makes reference to the size conversion table with respect to each of horizontal lines. Based on results of the reference, the size color conversion block 1005 reads the original pictures corresponding to the horizontal lines. Then, it performs color conversion on the read original pictures to produce converted pictures, which are then stored in the converted picture frame buffer 1006.

In the above operations, the size conversion table creation block 1001 does not make consideration on whether the input original pictures correspond to picture signals of frame form or picture signals of field form. For this reason, the aforementioned device reduces the original pictures by uniformly thinning out data of selected lines from picture data of one frame.

The aforementioned motion picture size reduction device suffers from the problem as follows:

When displaying motion pictures in a picture size reduced manner, distortions occur on reduced pictures, which is shown in FIG. 14A and FIG. 14B. FIG. 14A shows a picture representing a circle which is motionless. In the field form of pictures in which one frame is configured by combining two fields, when the above circle travels on the screen at a high speed, a certain time difference exists between two lines disposed in a vertical direction. In general, such a time difference is 1/60 second. FIG. 14B shows a result of process to uniformly thin out lines, wherein the circle is displayed using a odd-numbered field and an even-numbered field. Herein, a contour of the "circle" figure gets blurred or distorted.

SUMMARY OF THE INVENTION

It is an object of the invention to provide a picture size conversion method and a picture size conversion device, each of which is capable of avoiding deterioration of picture display quality such as a blur and distortion especially with respect to motion pictures of interlaced display method which are reduced in sizes.

This invention provides a picture size conversion method (and device) to avoid deterioration of picture display quality such as a blur and distortion, especially with respect to motion pictures which are displayed in accordance with an interlaced display method.

A size conversion table storing display flags are created in accordance with a reduction ratio which is designated in advance or which is calculated based on the original picture size and converted (or reduced) picture size. Each of the display flags represents a decision whether to allow display with respect to each of horizontal lines. At first, the method discriminates whether the reduction ratio belongs to a first range or a second range, while the method also discriminates whether each of horizontal lines belongs to an even-numbered field or an odd-numbered field within one frame. In the case of the first range of the reduction ratio which is relatively small, the method thins out all of horizontal lines belonging to the even-numbered field while selectively thinning out horizontal lines belonging to the odd-numbered field with reference to the size conversion table. In the case of the second range of the reduction ratio which is relatively large, the method does not at all thin out the horizontal lines of the even-numbered field while selectively thinning out the horizontal lines of the odd-numbered field with reference to the size conversion table. Thus, original pictures can be converted (or reduced) in sizes in different ways in response to the first range and second range of the reduction ratio respectively.

In addition, it is possible to further create a correction position table storing correction flags each representing whether to perform correction on each of the horizontal lines of the odd-numbered field that is not thinned out in the case of the second range of the reduction ratio. As the correction, a filter process is performed with respect to the aforementioned horizontal line(s). Thus, it is possible to further improve the picture display quality, especially with respect to the motion pictures which move on the screen at a high speed.

BRIEF DESCRIPTION OF THE DRAWINGS

These and other objects, aspects and embodiment of the present invention will be described in more detail with reference to the following drawing figures, of which:

FIG. 1 is a block diagram showing a configuration of a picture size conversion device in accordance with embodiment 1 of the invention;

FIG. 2A shows an example of content of a size conversion table which is created with respect to a first range of reduction ratio;

FIG. 2B shows an example of content of the size conversion table which is created with respect to a second range of reduction ratio;

FIG. 4 is a flowchart showing a picture size conversion process;

FIG. 7 shows a magnified image of the picture of FIG. 6B;

FIG. 9 shows an example of content of a correction position table used by the embodiment 2;

DESCRIPTION OF THE PREFERRED EMBODIMENT

Figure 3:
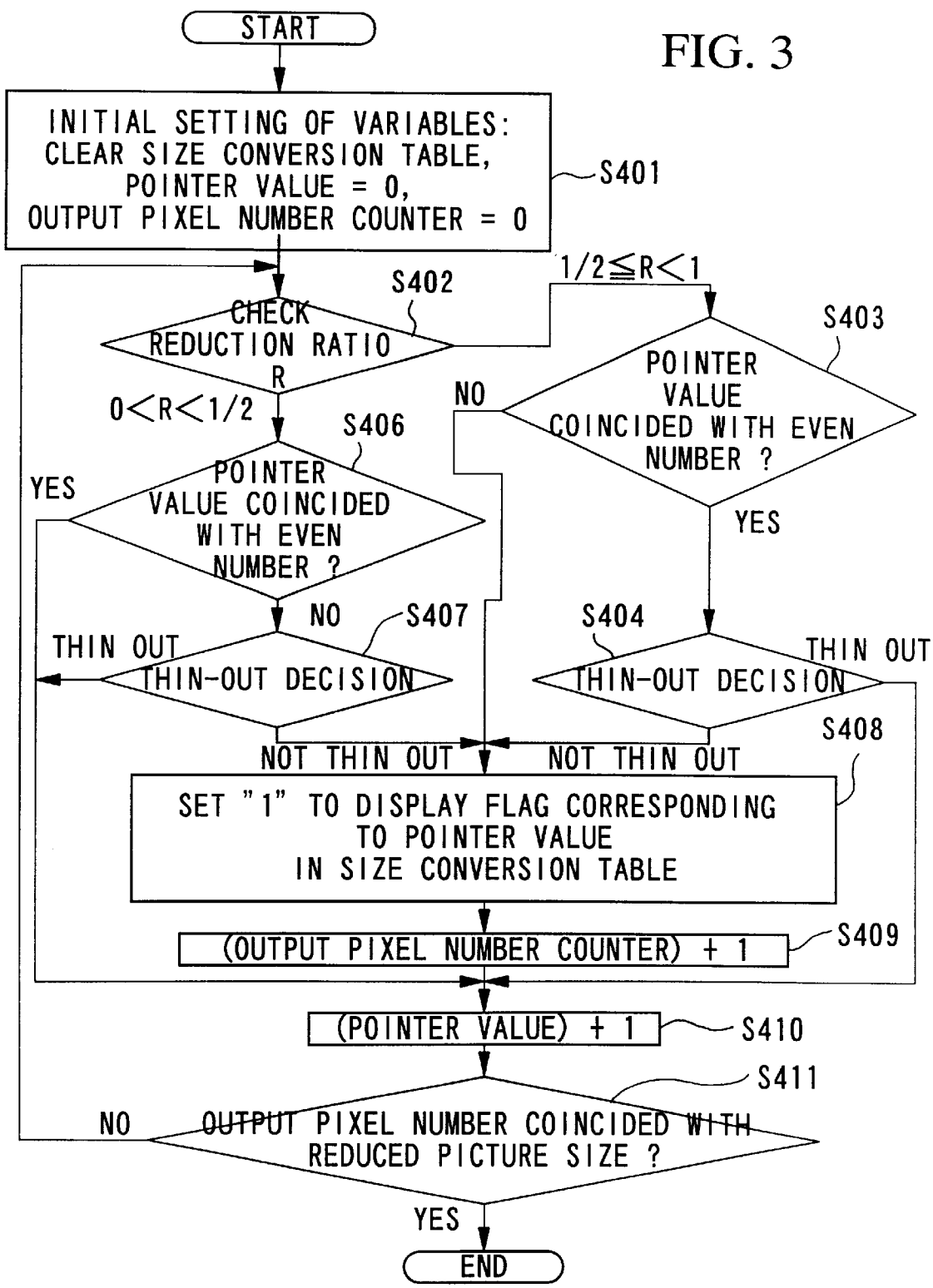
FIG. 3 is a flowchart showing procedures for creation of the size conversion table.

This invention will be described in further detail by way of examples with reference to the accompanying drawings.

[A] Embodiment 1

FIG. 1 shows a configuration of a picture size conversion device in accordance with embodiment 1 of the invention.

The picture size conversion device of the embodiment 1 is configured by a table creation section 110, a table memory 120, an original picture decode section 130, an original picture frame buffer 140, a picture conversion section 150, a converted picture frame buffer 160, a display control block 170 and a display unit 180.

The table memory 120 stores a size conversion table 121, which is created by the table creation section 110. The table creation section 110 is configured by a size conversion table creation block 111. When a user designates conversion of display picture size, the size conversion table creation block 111 determines a conversion ratio (e.g., reduction ratio) based on an original picture size and a converted picture size which is designated. In addition, the size conversion table creation block 111 creates a size conversion table 121 that designates horizontal lines which should be thinned out in accordance with the conversion ratio. Then, the size conversion table 121 is stored in the table memory 120.

FIG. 2A and FIG. 2B show examples of the size conversion table 121, which are respectively created under prescribed conditions and in accordance with the reduction ratio that is calculated. Specifically, FIG. 2A shows an example of the size conversion table 121 which is created under the condition that the reduction ratio is greater than zero and is less than ½, while FIG. 2B shows another example of the size conversion table 121 which is created under the condition that the reduction ratio is greater than ½ and is less than 1. In the interlaced display method, one frame of original pictures is configured by an odd-numbered field and an even-numbered field, both of which contain horizontal lines to be designated by pointers (or pointer). Herein, each of horizontal lines of the odd-numbered field is designated by the odd-numbered pointer (or pointer whose value corresponds to an odd number), while each of the horizontal lines of the even-numbered field is designated by the even-numbered pointer (or pointer whose value corresponds to an even number). Incidentally, each of the horizontal lines which should be thinned out is designated by a display flag whose value is "0", while each of the horizontal lines which are not thinned out is designated by a display flag whose value is "1".

The content of the size conversion table 121 at reduced conversion mode of original picture size is represented by binary numbers. As described above, the present embodiment does not thin out the horizontal lines corresponding to "1" of the display flag. In contrast, the present embodiment thins out the horizontal lines corresponding to "0" of the display flag. As described heretofore, the size conversion table 121 represents decisions as to whether the horizontal lines of the original pictures should be thinned out or not.

Under the condition that the reduction ratio is greater than 0 and is less than ½, the present embodiment thins out all of the horizontal lines belonging to the even-numbered field. For this reason, "0" is set to all of the even-numbered pointers in the size conversion table 121. In contrast, the horizontal lines of the odd-numbered field are selectively thinned out in accordance with the reduction ratio.

In the case that the reduction ratio is 0.25 as shown in FIG. 2A, "0" is set to all of the display flags which are provided for the pointer values corresponding to the even-numbered field. In addition, "1" is set to one out of two display flags within the display flags which are provided for the pointer values corresponding to the odd-numbered field.

In the case where the reduction ratio is greater than ½ and is less than 1, the present embodiment does not thin out all of the horizontal scanning lines of the even-numbered field. For this reason, "1" is set to all of the even-numbered pointers of the size conversion table 121. In contrast, the present embodiment selectively thins out the horizontal scanning lines of the odd-numbered field in accordance with the reduction ratio.

Therefore, in the case where the reduction ratio is 0.75 as shown in FIG. 2B, "1" is set to all of the display flags which are provided for the pointer values corresponding to the even-numbered field. In contrast, "1" is set to one out of two display flags within the display flags which are provided for the pointer values corresponding to the odd-numbered field.

The size conversion table creation block 111 has the pointer(s) as well as an output line (or pixel) number counter and a reduction ratio register, all of which are not shown in the Figures. Now, when a reduction ratio is calculated and is set to the reduction ratio register, a decision is made as to whether each of the horizontal lines designated by the pointer values should be thinned out or not. Such a decision is made in accordance with an equation as follows:

$$A = (\text{pointer value}) \times (\text{converted or reduced picture size}) \div (\text{original picture size}) \tag{1}$$

The present embodiment does not thin out a horizontal line designated by the pointer value corresponding to "A" whose integer part is greater than a value of the output line number counter. In contrast, it thins out a horizontal line designated by the pointer value corresponding to "A" whose integer part is smaller than the value of the output line number counter.

The original picture decode section 130 contains an even-number field decode block 131 and an odd-number field decode block 132. Herein, the even-number field decode block 131 decodes input original picture signals to produce original picture data of an even-numbered field, which are stored therein. The odd-number field decode block 132 decodes the input original picture signals to produce original picture data of an oddnumbered field, which are stored therein. Thus, the original picture decode section 130 stores original pictures of one frame.

Based on the original picture data of the even-numbered field and odd-numbered field stored in the original picture decode section 130, the original picture frame buffer 140 produces and stores original picture data of one frame.

The picture conversion section 150 is equipped with a size conversion block 151. The size conversion block 151 reads the original picture data of one frame from the original picture frame buffer 140. Using the size conversion table 121, the size conversion block 151 effects size conversion process on the original picture data.

Then, the converted picture frame buffer 160 stores converted picture data, which was subjected to size conversion process effected by the picture conversion section 150. The display control block 170 reads the converted picture data of one frame from the converted picture frame buffer 160. Thus, the display control block 170 controls the display unit 180 to display the converted picture data on the screen in accordance with the motion picture display timing.

Next, a description will be given with respect to operations of the picture size conversion device of the embodiment 1 with reference to FIG. 1 to FIG. 7. FIG. 3 is a flowchart showing procedures for creation of the picture size conversion table, which is effected by the size conversion table creation block 111 shown in FIG. 1.

The content of the size conversion table 121 at a picture reduction mode is represented by binary numbers, which is shown in FIG. 2A, FIG. 2B and FIG. 7, for example. As described before, the size conversion table 121 is created in such a way that horizontal lines each corresponding to "1" of the display flag are not thinned out but horizontal lines each corresponding to "0" of the display flag are thinned out from the original picture. Basically, the process for creation of the size conversion table at the picture reduction mode is divided into two flows of steps in response to ranges of the reduction ratio. A first flow of steps are provided for an event that the original picture is reduced in size in accordance with a first range of the reduction ratio which is greater than 0 and is less than ½. In such a range of the reduction ratio, all of picture data are thinned out with respect to either the odd-numbered field or even-numbered field. In addition, the picture size conversion device of the present embodiment (hereinafter, simply referred to as the device) performs process to determine horizontal lines which should be thinned out with respect to the field whose horizontal lines are not thinned out. A second flow of steps are provided for an event that the original picture is reduced in size in accordance with a second range of the reduction ratio which is ½ or more and is less than 1. In such a range of the reduction ratio, all of picture data are thinned out with respect to either the odd-numbered field and even-numbered field. In addition, the device performs process to determine horizontal lines which should be thinned out with respect to the field whose horizontal lines are not thinned out.

With reference to FIG. 3, the device performs initial setting of variables in step S401. That is, all of values listed in the size conversion table 121 are cleared to zero. In addition, a pointer and an output pixel number counter are both reset to zero. Herein, a value of the pointer (i.e., pointer value) represents a position of a line, which is now subjected to calculation in the original picture, in a vertical direction of the screen. The pointer value ranges between "0" and a value corresponding to "(original picture size)−1".

In step 402, the device calculates a conversion ratio based on the original picture size and the converted picture size after reduction. In other words, the device calculates a reduction ratio, which is then stored in the reduction ratio register. Then, the device makes a decision as to whether the reduction ratio (R) belongs to the first range where $0 < R < \frac{1}{2}$ or the second range where $\frac{1}{2} \leq R < 1$.

In the case of the first range of the reduction ratio, the device transfers control to step S406. In step S406, a decision is made as to whether the pointer value corresponds to an even number or not. In the case where the pointer value corresponds to the even number, in other words, when the pointer value designates a horizontal line belonging to the even-numbered field, the device thins out such a horizontal line. For this reason, the device does not renew values presently set to the size conversion table 121. As a result, "0" is still set to all of the display flags designated by the pointer values corresponding to the even-numbered field.

Thereafter, the device transfers control to step S410. In step S410, the device increases the pointer value by an increment of "1". In next step S411, a decision is made as to whether an output line number (i.e., a number of lines to be output) coincides with a number of lines of the converted picture size or not. That is, a decision is made as to whether an output pixel number (i.e., a number of pixels to be output) coincides with a reduced picture size or not. In other words, a decision is made as to whether the device completes processing of the converted picture data of one frame or not. If the device does not complete the processing of the converted picture data of one frame, the device revert control to step S420 so as to perform it again. Incidentally, the output line number represents a number of lines each corresponding to "1" of the display flag in the size conversion table 121. The output line number ranges between zero and a value corresponding to the reduced picture size.

In step S406, if the pointer value corresponds to an odd number, in other words, if the pointer designates picture data regarding the oddnumbered field, the device proceeds to step S407 wherein a decision is made at to whether a horizontal line designated by the pointer value should be thinned out or not. In the case of the reduction ratio of 0.25, for example, if the pointer value is 1, the output line number counter indicates "0". So, according to the aforementioned equation (1), if the pointer value is "1", the corresponding horizontal line is not thinned out.

If the horizontal line designated by the pointer value is not thinned out, the device proceeds to step S408. In step S408, "1" is set to the display flag corresponding to the pointer value in the size conversion table 121 as shown in FIG. 2A. In next step S409, a value of the output line number counter is increased by an increment of "1". In this case, it is increased to "1". Thereafter, the device proceeds to step S410.

If a result of the decision of the step S407 indicates that the horizontal line designated by the pointer value is thinned out, the content of the size conversion table 121 is not renewed. That is, the display flag corresponding to the pointer value in the size conversion table 121 remains at "0". For instance, if the pointer value is "3", the foregoing equation (1) is represented by "A=3×0.25", a result of which is less than "1" of the output line number counter. Thus, the horizontal line designated by the pointer value is thinned out, while the content of the size conversion table 121 is not renewed. That is, as shown in FIG. 2A, the display flag corresponding to the pointer value remains at "0". Thereafter, the device proceeds to step S410.

If a result of the decision of the step S402 indicates that the reduction ratio belongs to the second range where ½≦R<1, the device transfers control to step S403. In step S403, a decision is made as to whether the pointer value corresponds to an even number or not. In the case where the reduction ratio belongs to the aforementioned second range, the device proceeds directly to steps S408 and S409 without executing step S404.

In steps S408 and S409, "1" is set to the display flag corresponding to the pointer value which corresponds to the odd number. Because horizontal lines designated by the pointer values each corresponding to the odd number are not at all thinned out as shown in FIG. 2B, picture data of the odd-numbered filed are all displayed.

If the pointer value corresponds to the even number in step S403, the device proceeds to step S404 wherein a decision is made as to whether the horizontal line designated by the pointer value should be thinned out or not. If a result of the decision of the step S404 indicates that the horizontal line designated by the pointer value is not thinned out, the device transfers control to step S408.

For instance, if the pointer value is "2", a value of the output line number counter is "1". Thus, the aforementioned equation (1) is represented by "A=2×0.75=1.5", which is greater than the value of the output line number counter. Therefore, "1" is set to the display flag corresponding to the pointer value which is "2" in the size conversion table 121 as shown in FIG. 2B. Thereafter, the device proceeds to step S409.

If the pointer value is "4", a value of the output line number counter is "3". So, the aforementioned equation (1) is represented by "A=4×0.75=3", which is not greater than the value of the output line number counter. Therefore, "0" is set to the display flag corresponding to the pointer value which is "4" in the size conversion table 121 as shown in FIG. 2B. So, the device performs a thin-out operation with respect to the pointer value of "4", then, it proceeds to step S410.

Next, FIG. 4 is a flowchart showing a picture size conversion process performed by the picture size conversion device of the embodiment 1 of the invention. With reference to FIG. 4, the device firstly proceeds to step S501 wherein it performs initial setting of variables. In addition, the picture conversion section 150 obtains the size conversion table 121.

In step S502, a decision is made as to whether the display flag corresponding to the pointer value in the size conversion table 121 is set at "1" or "0". In the case of "1" of the display flag, the device transfers control to step S505.

As described before, the horizontal line corresponding to the pointer value whose display flag is "1" is not thinned out. So, in step S505, data of the horizontal line are read from the original picture frame buffer 140 and are then stored in the converted picture frame buffer 160. In this case, it is possible to thin out some pixels on the horizontal line in accordance with the known method, for example. Thus, it is possible to obtain picture data representing a reduced version of the horizontal line. After completion of the step S505, the device transfers control to step S506.

If a result of the decision of the step S502 indicates that the display flag corresponding to the pointer value is set at "0", the horizontal line designated by the pointer value is thinned out. Therefore, the device proceeds directly to step S506 without reading the original picture frame buffer 140 the picture data representing the horizontal line designated by the pointer value whose display flag is "0".

In step S506, the device performs preparation for processing of the horizontal line designated by the next pointer value. That is, the pointer value for reading of original picture data is increased by an increment of "1". In addition, a position for decision of bit (i.e., a position to detect the display flag) on the size conversion table is shifted to a position that corresponds to the next horizontal line corresponding to the next pointer value.

In next step S507, a decision is made as to whether the device completes processing with regard to one frame or not. If the device does not complete the processing with regard to one frame, the device repeats the foregoing steps, which range from step S502 to S506, a number of times, which corresponds to a number of horizontal lines disposed in a vertical direction on the screen. Thus, it is possible to perform size conversion process.

Thereafter, the display control block 170 loads picture data representing converted picture from the converted picture frame buffer 160. Thus, the display control block 170 controls the display unit 180 to display the converted picture on the screen of the display unit 180 in synchronization with the display timing. In the case of the motion picture processing, the device performs a series of processes, which range from the decode process of the original picture to the display process, repeatedly to achieve display of the motion picture(s).

Figure 5A:
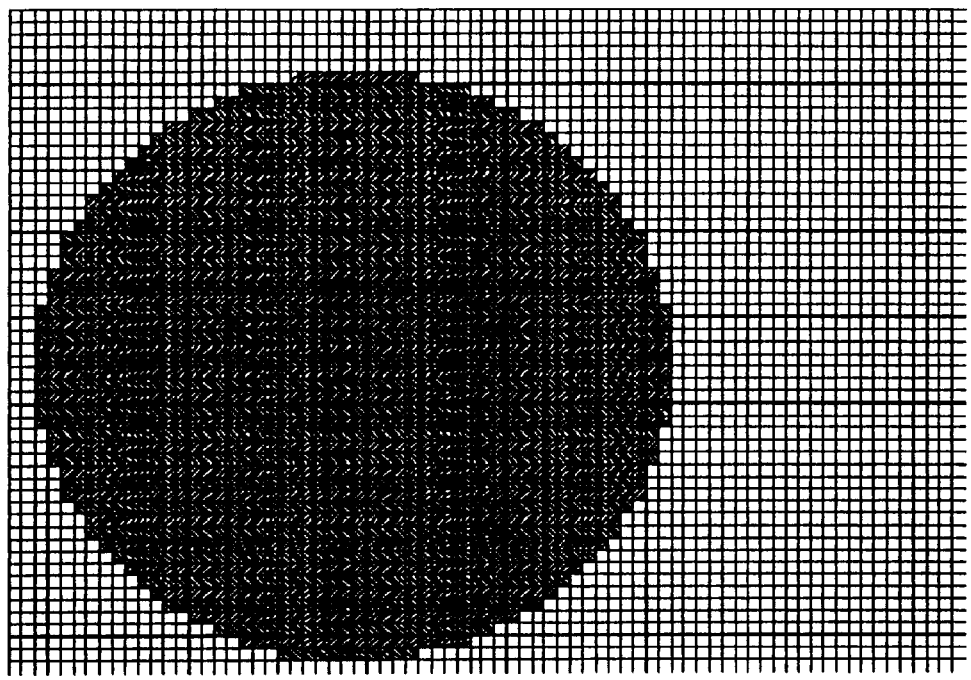
FIG. 5A and FIG. 5B show a manner of high-speed movement of a picture representing a circle displayed on a screen.
Figure 5B:
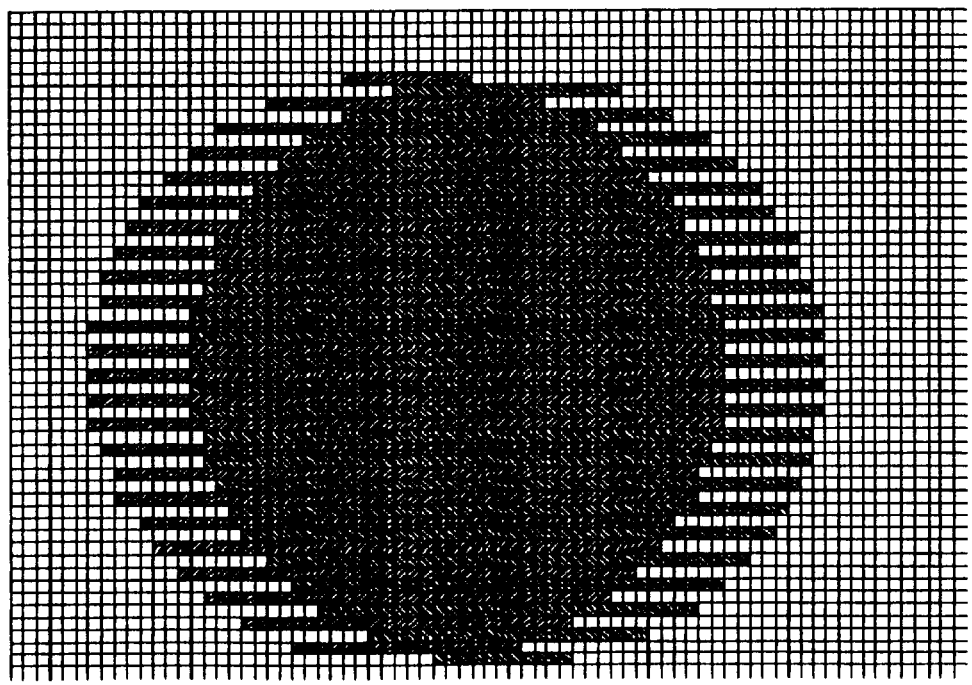
Figure 6A:
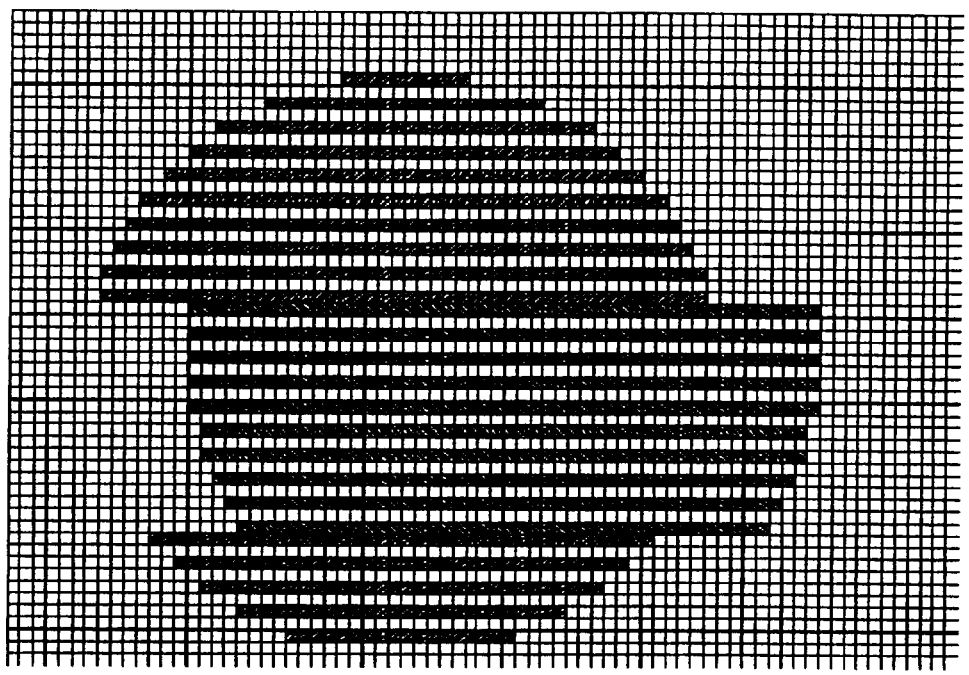
FIG. 6A shows a distortion phenomenon that the circle originally displayed as shown in FIG. 5A travels in a right direction on the screen at a high speed to allow occurrence of distortion.

According to the embodiment 1 described heretofore, no distortion occurs on the pictures which are reduced in sizes. FIG. 5A and FIG. 5B show a manner of high-speed movement of a picture representing a circle which is displayed on the screen. Suppose that one frame is configured by combining an even-numbered field and an odd-numbered field together. Now, the circle shown in FIG. 5A travels at a high speed in a right direction on the screen. In that case, a transition of travel of the circle is shown in FIG. 5B because there exist a time difference of $\frac{1}{60}$ second per one horizontal line. In the conventional picture size conversion method that reduction of picture size is performed by uniformly thinning out horizontal lines, there occurs a distortion phenomenon that the circle is distorted as shown in FIG. 6A.

In contrast to the conventional picture size conversion method, the picture size conversion method of the present embodiment performs reduction of picture size in such a way that horizontal lines of one field are all thinned out or all remained as they are while horizontal lines of another field are selectively thinned out. Thus, the present embodiment is capable of providing a picture as shown in FIG. 6B in which distortion can be canceled.

Figure 6B:
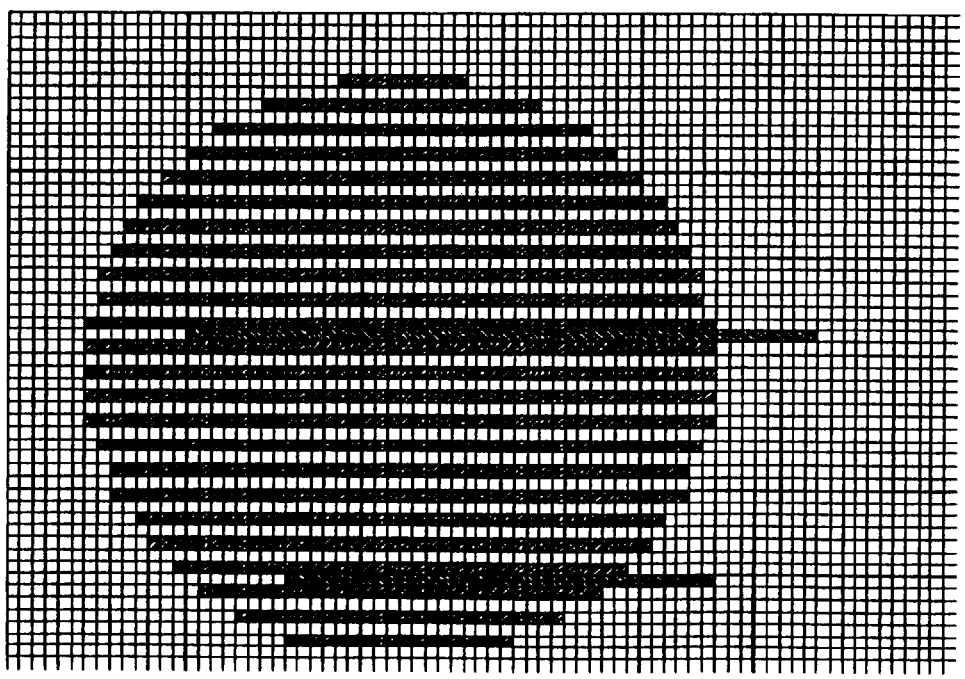
FIG. 6B shows an effect of the embodiment 1 that the distortion phenomenon is canceled.

FIG. 7 shows a magnified image of FIG. 6B, wherein the content of the size conversion table is determined such that all of the horizontal lines are thinned out with respect to one field.

[B] Embodiment 2

Next, with reference to FIG. 8 and its following figures, a description will be given in detail with respect to a picture size conversion device in accordance with embodiment 2 of the invention.

Figure 8:
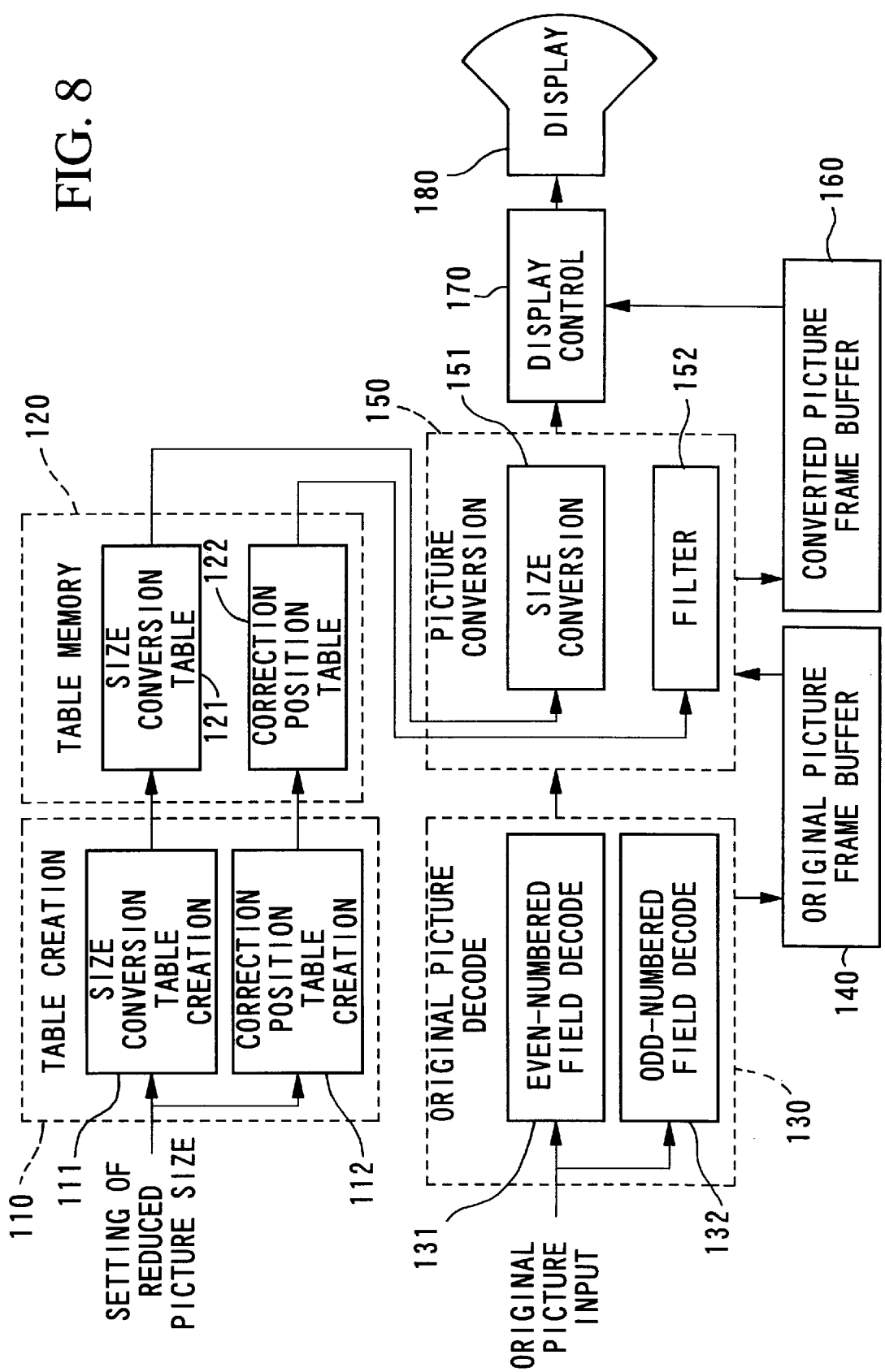
FIG. 8 is a block diagram showing a configuration of a picture size conversion device in accordance with embodiment 2 of the invention.

FIG. 8 shows a configuration of the picture size conversion device in accordance with the embodiment 2 of the invention. In FIG. 8, the picture size conversion device of the embodiment 2 is configured by a table creation section 110, a table memory 120, an original picture decode section 130, an original picture frame buffer 140, a picture conversion section 150, a converted picture frame buffer 160, a display control block 170 and a display unit 180.

The table creation section 110 is configured by a size conversion table creation block 111 and a correction position (or flag) table creation block 112. The table memory 120 is configured by a size conversion table 121 and a correction position table 122. Further, the picture conversion section 150 is configured by a size conversion block 151 and a filter block 152.

The size conversion table creation block 111 and size conversion table 121 are identical to ones used by the embodiment 1 of FIG. 1, hence, the description thereof will be omitted.

The correction position table creation block 112 operates when a user designates a converted picture size. That is, the correction position table creation block 112 creates a correction position table based on the original picture size and converted picture size. Then, the correction position table 122 as shown in FIG. 9 is stored in the table memory 120.

The filter block 152 performs filter process on picture data which are read from the original picture frame buffer 140. Then, converted picture data are stored in the converted picture frame buffer 160.

Next, a description will be given with respect to operations of the picture size conversion device of the embodiment 2 of the invention.

Figure 10:
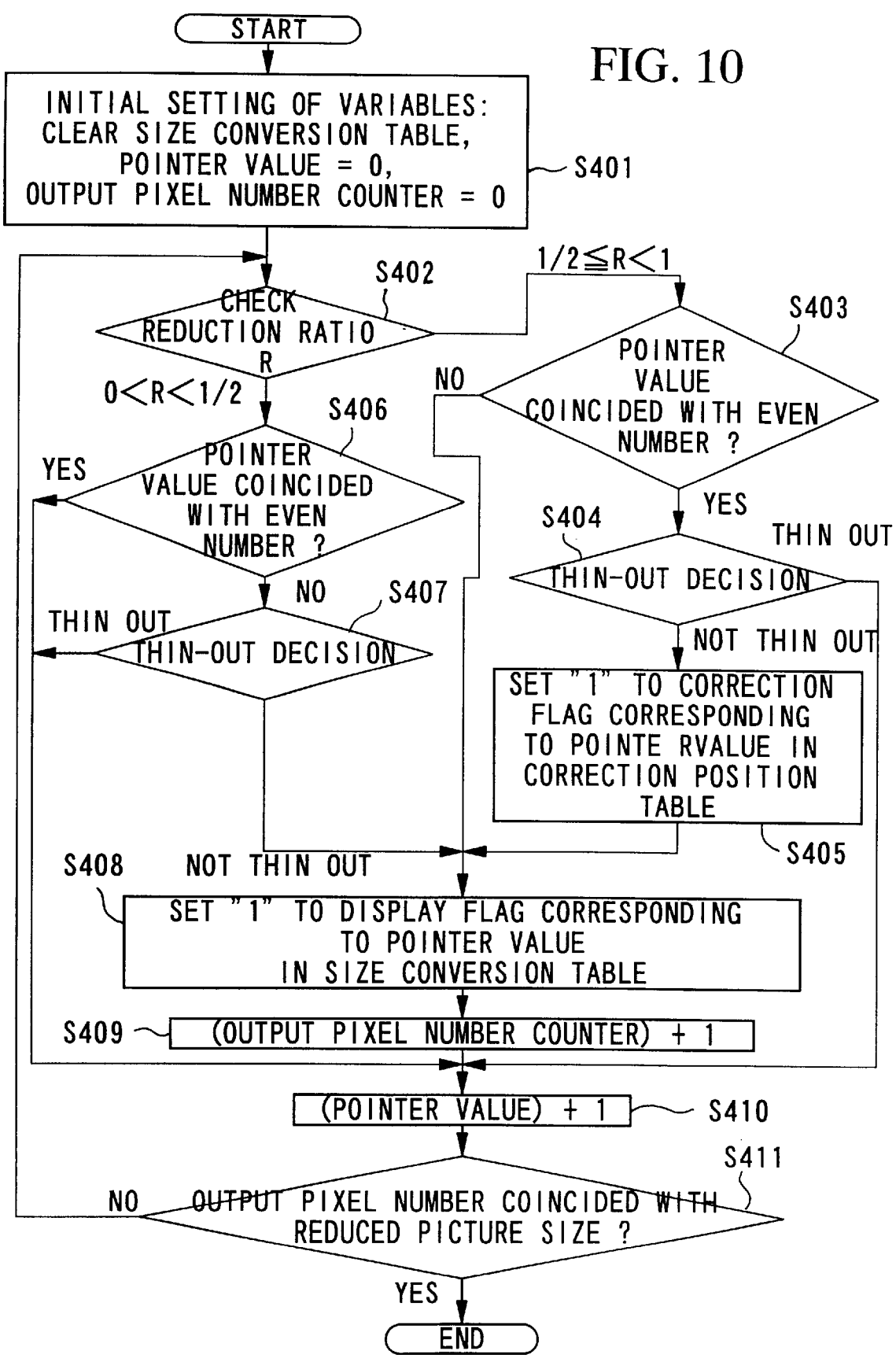
FIG. 10 is a flowchart showing procedures for creation of a size conversion table and a correction position table.

FIG. 10 is a flowchart showing procedures for creation of the size conversion table and correction position table, which are created by the table creation section 110. In FIG. 10, steps equivalent to those shown in FIG. 3 will be designated by the same numerals, hence, the description thereof will be omitted. Like the size conversion table, the content of the correction position table can be represented by binary numbers. Herein, filter process is performed with respect to horizontal lines of the original picture for which "1" is set to filter flags.

With reference to FIG. 10, the device firstly proceeds to step S401 to perform initial setting of variables. That is, all of the values listed on the size conversion table 121 and the correction position table 122 are cleared to zero. In addition, the pointer value and output pixel number counter (or output line number counter) are both reset to zero. Like the foregoing embodiment 1, the pointer values employed by the embodiment 2 represent positions of horizontal lines which are arranged in a vertical direction on the screen. So, the pointer value ranges from "0" to a value corresponding to "(original picture size)–1".

In step S402, the device calculates a conversion ratio based on the original picture size and the converted picture size after reduction. Namely, the device calculates a reduction ratio. Then, a decision is made as to whether the reduction ratio (R) belongs to a first range where $0<R<\frac{1}{2}$ or a second range where $\frac{1}{2} \leq R<1$.

In the case of the first range of the reduction ratio where $0<R<\frac{1}{2}$, the device transfers control to step S406. In step S406, a decision is made as to whether the pointer value corresponds to an even number or not. If the pointer value corresponds to the even number, in other words, if the pointer value designates picture data of an even-numbered field, all of horizontal lines are thinned out with respect to such an even-numbered field. For this reason, the device does not renew the content of the size conversion table 121.

After completion of the step S406, the device proceeds to step S410. In step S410, the pointer value is increased by an increment of "1". In next step S411, a decision is made as to whether an output line number coincides with a line number of the converted picture size which is designated or not. That is, a decision is made as to whether an output pixel number corresponds to the reduced picture size or not. In other words, a decision is made as to whether the device completes processing with respect to converted picture data of one frame or not. If the device does not complete the processing with respect to the converted picture data of one frame, the device reverts control to step S402. Incidentally, the output line number represents a number of horizontal lines corresponding to the display flags which are set at "1" on the size conversion table 121. So, the output line number ranges from "0" to a value corresponding to the reduced picture size.

If the pointer value corresponds to an odd number in step S406, in other words, if the pointer value designates picture data of an odd-numbered field, the device proceeds to step S407. Herein, a decision is made as to whether horizontal lines designated by the pointer values should be thinned out or not with respect to such an odd-numbered field. Such a decision is made based on the aforementioned equation (1).

In the case where the horizontal scanning line designated by the pointer value is thinned out, the device does not renew the content of the size conversion table 121. Namely, the display flag corresponding to the above pointer value remains at "0". On the other hand, if the horizontal line designated by the pointer value is not thinned out, the device proceeds to step S408.

In step S408, "1" is set to the display flag corresponding to the pointer value whose horizontal line is not thinned out on the size conversion table 121. In next step S409, a value of the output line number counter is increased by an increment of "1". Then, the device proceeds to step S410.

Next, if a result of the decision of the step S402 indicates that the reduction ratio (R) belongs to the second range where $\frac{1}{2} \leq R < 1$, the device proceeds to step S403. In step S403, a decision is made as to whether the pointer value corresponds to an even number or not. In the case of the second range of the reduction ratio where $\frac{1}{2} \leq R < 1$, all of horizontal lines are not thinned out with respect to the pointer values each corresponding to the odd number. In other words, the device displays all picture data regarding the odd-numbered field. For this reason, the device proceeds to steps S408 and S409 from step S403.

If the pointer value corresponds to an even number in step S403, the device proceeds to step S404 wherein a decision is made as to whether the horizontal line designated by the pointer value should be thinned out or not. In the case where the horizontal line designated by the pointer value is thinned out, the device does not renew the content of the size conversion table 121. Thereafter, the device transfers control to step S410.

In the case where a result of the decision of the step S404 indicates that the horizontal line designated by the pointer value is not thinned out, the device proceeds to step S405. In step S405, "1" is set to a correction flag corresponding to the pointer value on the correction position table. This is because a picture deviation occurs due to a time difference between the odd-numbered field and even-numbered field. So, it is necessary to effect filter process with respect to the position of the horizontal line which is not thinned out. After completion of the step S405, the device transfers control to step S408. In step S408, "1" is set to the position (i.e., display flag) corresponding to the pointer value on the size conversion table 121. Thus, it is possible to renew the content of the size conversion table 121.

Figure 11:
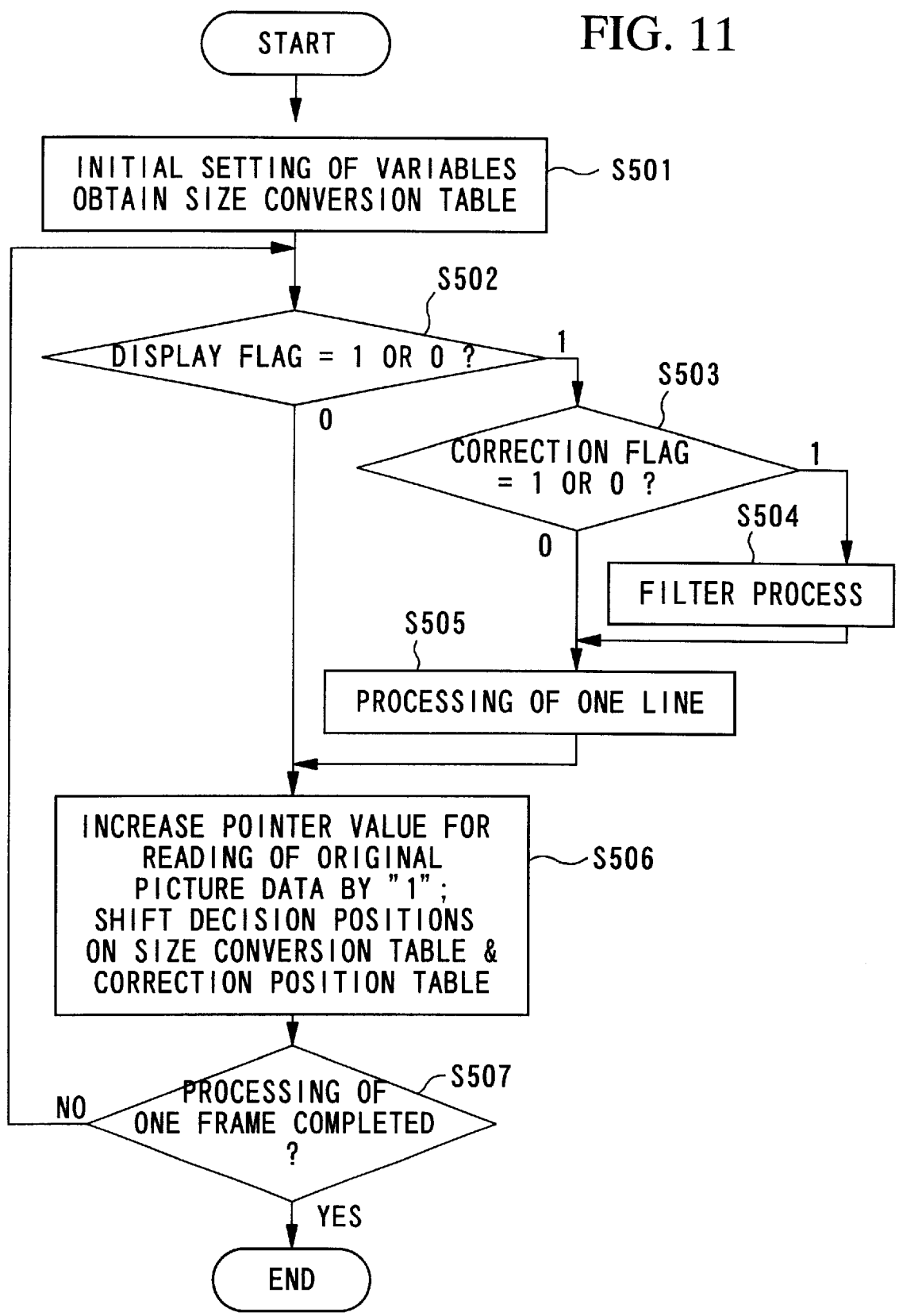
FIG. 11 is a flowchart showing a picture size conversion process.

Next, FIG. 11 is a flowchart showing a picture size conversion process effected by the picture size conversion device of the embodiment 2 of the invention. In FIG. 11, steps equivalent to those of FIG. 4 are designated by the same numerals; hence, the description thereof will be omitted occasionally. Now, with reference to FIG. 11, the device firstly proceeds to step S501 to engage initial setting of variables. In addition, the device obtains the size conversion table 121 and the correction position table 122. Further, the pointer value is reset to zero.

In step S502, a decision is made as to whether the display flag corresponding to the pointer value on the size conversion table 121 is set at "1" or "0". In the case of "1" of the display flag, the device transfers control to step S503.

In step S503, a decision is made as to whether the correction flag corresponding to the pointer value on the correction position table 122 is set at "1" or "0". In the case of "1" of the correction flag, the device transfers control to step S504, wherein filter process is performed.

An example of the filter process is described as follows:

In the original picture, each of pixels on the horizontal line corresponding to the correction flag is compared with one of upper and lower horizontal lines which are arranged just above or just below the horizontal line corresponding to the correction flag. If a value of the pixel on the horizontal line belongs to a range of values of pixels respectively belonging to the upper and lower horizontal lines, the device does not perform correction on the pixel. However, if it exceeds the range, the value of the pixel belonging to either the upper and lower horizontal lines is copied onto the pixel on the horizontal line corresponding to the correction flag.

After completion of the step S504, the device proceeds to step S505 wherein the horizontal line corresponding to the correction flag which is "1" is not thinned out, so picture data thereof are stored in the converted picture frame buffer 160.

In the case of "0" of the correction flag, the device proceeds directly to step S505 wherein picture data representing the horizontal line corresponding to the display flag are stored in the converted picture frame buffer 160. In this case, it is possible to thin out some pixels from the horizontal line corresponding to the display flag in accordance with the known method. Thus, it is possible to obtain picture data of a reduced line. After completion of the step S505, the device transfers control to step S506.

If the display flag corresponding to the pointer value is set at "0" in step S502, the horizontal line corresponding to the display flag is thinned out. Herein, picture data representing the horizontal line which is thinned out is not stored in the converted picture frame buffer 160. Then, the device proceeds to step S506.

In step S506, the pointer value for reading of the original picture is increased by an increment of "1" in order to make preparation for making a decision with regard to the next display flag (or next pointer value). Thus, a decision position on the size conversion table 121 is shifted to one (i.e., next pointer value) designating the next horizontal line. In addition, a decision position on the correction flag table 122 is shifted to one (i.e., next pointer value) designating the next horizontal line.

In next step S507, a decision is made as to whether the device completes processing of one frame or not. If the device does not complete the processing of one frame, the device reverts control to step S502 so as to repeat a series of steps that range from S502 to S506 a number of times which corresponds to a number of horizontal lines disposed in a vertical direction on the screen. Thus, it is possible to perform the size conversion process.

Thereafter, the display control block 170 loads converted picture data from the converted picture frame buffer 160. Then, the display control block 170 controls the display unit 180 to display the converted picture on the screen in synchronization with the display timing. In the case of the motion picture processing, the device repeatedly performs a series of processes, which range from the decode process to the display process, to display the motion picture(s) on the screen.

Figure 12A:
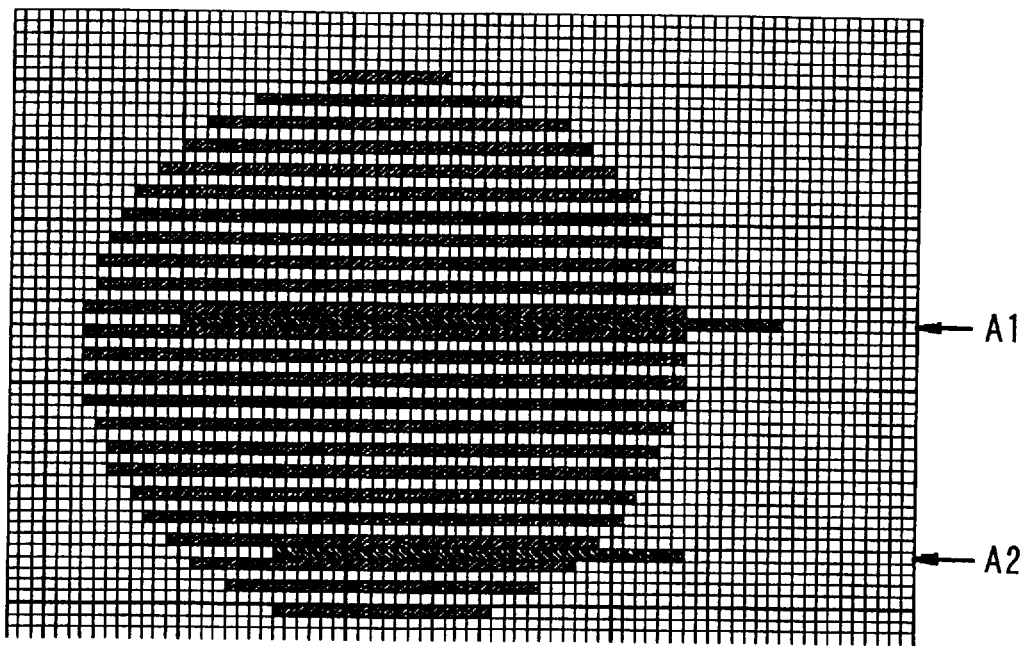
FIG. 12A shows an example of a picture representing a circle which is subjected to simple thin-out operation.
Figure 12B:
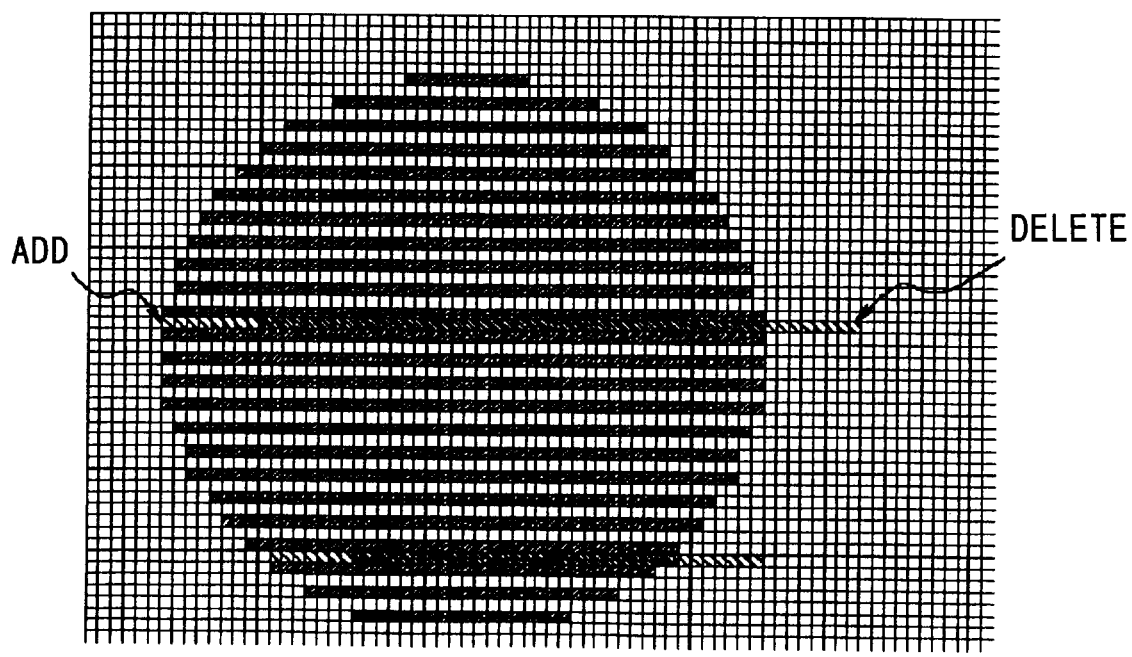
FIG. 12B shows a result of filter process which is effected on the picture shown in FIG. 12A.
Figure 13:
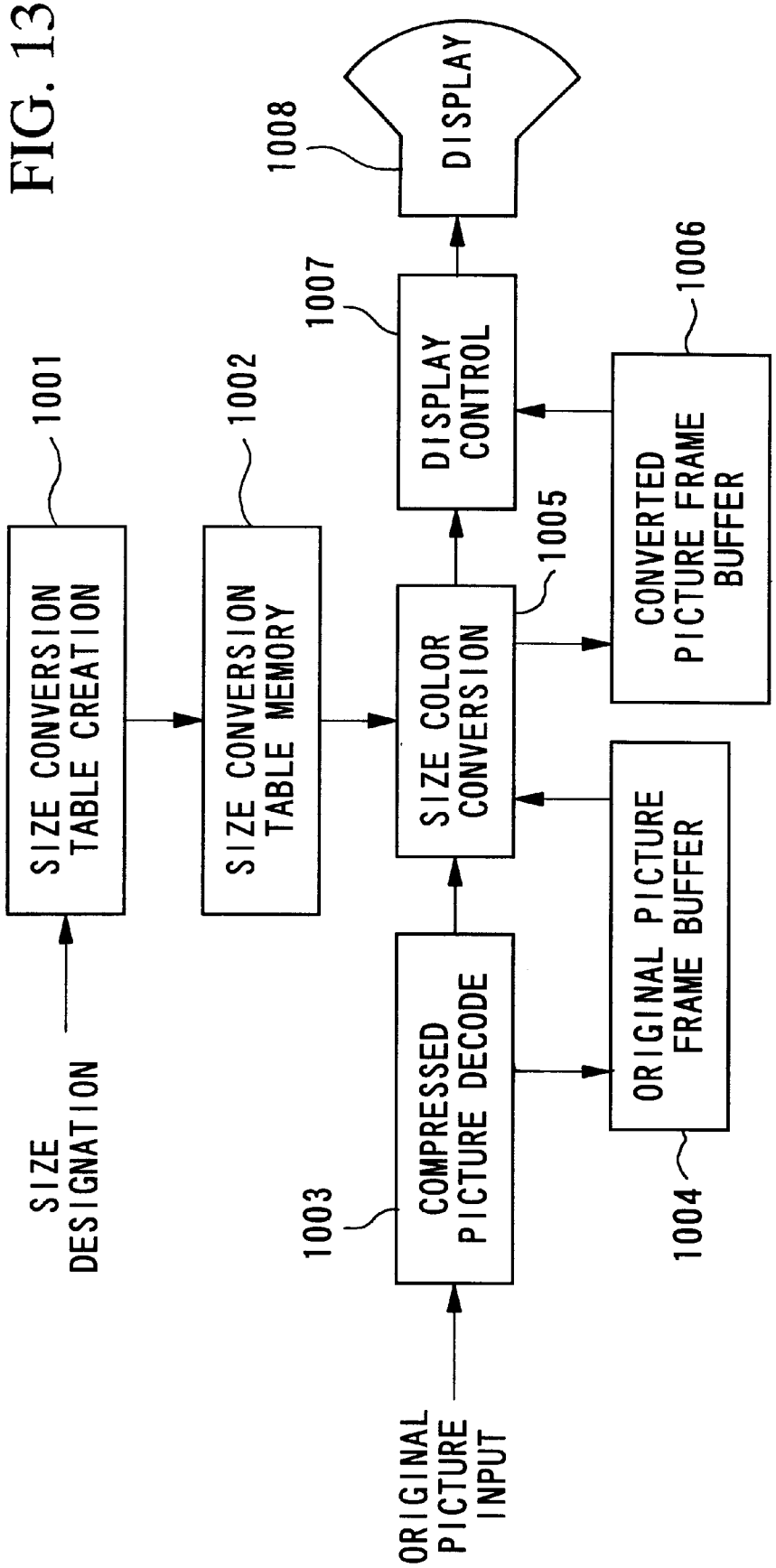
FIG. 13 is a block diagram showing a configuration of a motion picture size reduction device.
Figure 14A:
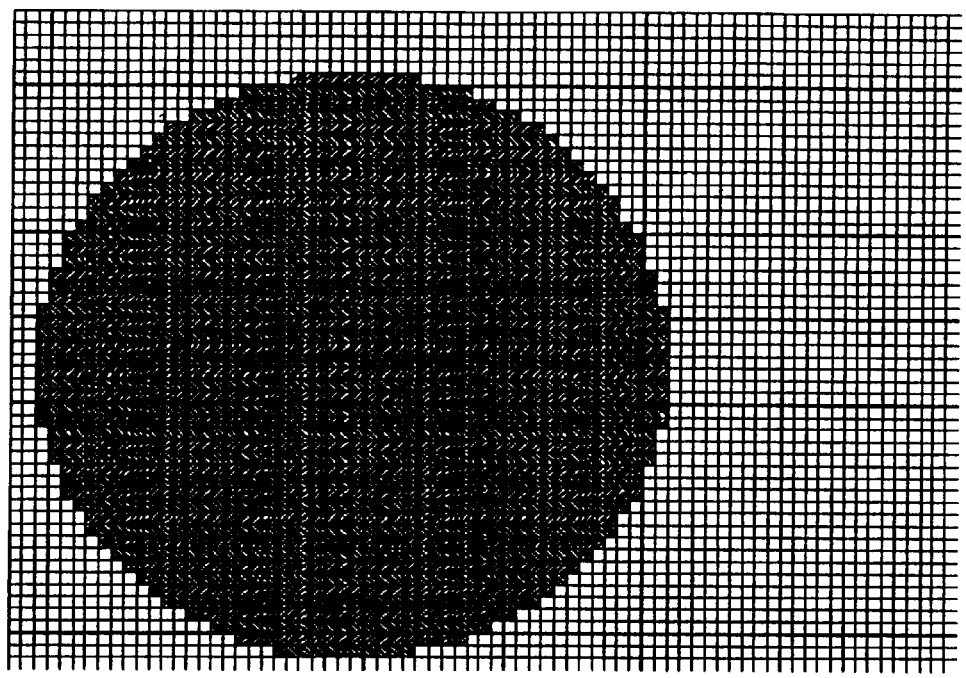
FIG. 14A shows an example of a circle which is displayed on a screen.
Figure 14B:
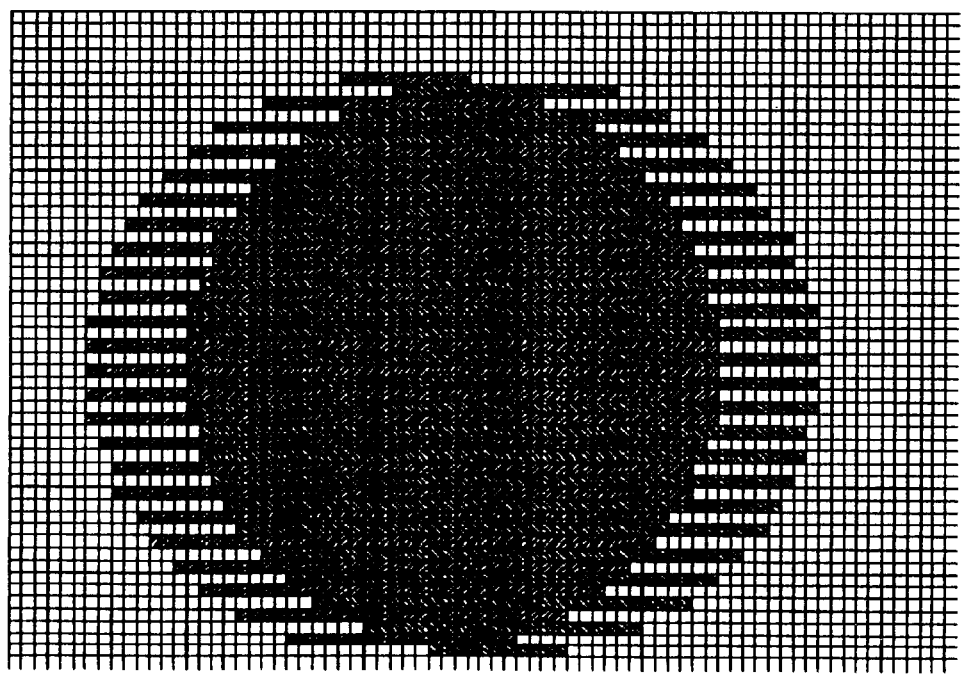
FIG. 14B shows the circuit which travels in a rightward direction on the screen at a high speed.

FIG. 12A and FIG. 12B show examples of pictures with regard to filter process. Specifically, FIG. 12A shows an example of the picture which is subjected to simple thin-out operation. Herein, if the filter process is effected with regard to lines A1 and A2, it is possible to obtain the picture shown in FIG. 12B. As for the line A1 (or A2), for example, an extended part is deleted while pixels are added with regard to a blank part. Thus, it is possible to obtain a desired picture that the user does not feel wrongness in vision due to deviation of the lines.

According to the embodiments of the invention as described heretofore, in the case of the first range of the reduction ratio (R) where 0<R<½, the horizontal lines of the even-numbered field are all thinned out while the horizontal lines of the odd-numbered field are selectively thinned out. In the case of the second range of the reduction ratio (R) where ½≦R<1, all of the horizontal lines of the odd-numbered field are displayed while the horizontal lines of the even-numbered field are selectively thinned out. Of course, a relationship between the odd-numbered field and even-numbered field can be reversed with respect to the thin-out operation.

In the embodiments, all the values on the table(s) are reset to zero at the initial state. However, it is possible to modify the embodiments such that all the values on the table(s) are set at "1" while the display flags are set at "0" with respect to the horizontal lines which are thinned out.

According to the invention described heretofore, it is possible to improve the picture display quality when the picture data are displayed in a picture size reduced manner especially in the case of the motion picture display method of the non-interlaced display method, which is achieved as follows:

Picture data of field form based on the interlaced display method are arranged in such a way that picture data of the even-numbered field and odd-numbered field are alternatively arranged every horizontal line. Thus, picture data of one frame are produced and are then displayed on the screen in accordance with the non-interlaced display method.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A picture size conversion device comprising:
    original picture storing means for storing one frame of original picture which is configured by an odd-numbered field and an even-numbered field;
    converted picture storing means;
    conversion table means for determining whether to thin out each of horizontal lines with respect to either the odd-numbered filed or the even-numbered field in accordance with a reduction ratio; and
    picture conversion means for with reference to the conversion table means, making a decision as to whether each of the horizontal lines of original picture data stored in the original picture storing means is thinned out or not, so that if the horizontal line is not thinned out, the picture conversion means reads from the original picture storing means original picture data corresponding to the horizontal line, which is then stored in the converted picture storing means.

2. A picture size conversion device according to claim 1 further comprising conversion table creation means for creating the conversion table means.

3. A picture size conversion device according to claim 2, wherein the conversion table creation means creates the conversion table means in such a way that if the reduction ratio is greater than 0 and is less than ½, all of horizontal lines corresponding to one field, which is either the odd-numbered field and the even-numbered field, are thinned out while horizontal lines corresponding to another field are selectively thinned out in accordance with the reduction ratio.

4. A picture size conversion device according to claim 2, wherein if the reduction ratio is ½ or more but is less than 1, the conversion table creation means creates the conversion table means in such a way that horizontal lines corresponding to one field, which is either the odd-numbered field and the even-numbered field, are not at all thinned out while horizontal lines corresponding to another field are selectively thinned out in accordance with the reduction ratio.

5. A picture size conversion device according to claim 4 further comprising correction position table means for determining whether to perform filter process with respect to each of the horizontal lines of the original picture data, wherein the picture conversion means reads each of the horizontal lines of one of the odd-numbered field and the even-numbered field which are not at all thinned out from the original picture storing means so as to make a decision as to whether the filter process is required for each of the read horizontal lines or not with reference to the correction position table means, so that if the filter process is not required, the picture conversion means stores picture data of the read horizontal line which does not require the filter process in the converted picture storing means, while if the filter process is required, the picture conversion means performs the filter process on the read horizontal line which requires the filter process based on at least one of upper and lower horizontal lines which are located above and below the read horizontal line.

6. A picture size conversion device according to claim 5 further comprising correction position table creation means for creating the correction position table means on the basis of a result of a decision as to whether each of the upper and lower horizontal lines, within the horizontal lines of one of the odd-numbered field and the even-numbered field which are not thinned out, belong to a same field.

7. A picture size conversion device according to claim 2, wherein when a converted picture size is designated, the conversion table creation means calculates the reduction ratio based on a picture display size of the original picture.

8. A picture size conversion device according to claim 2 further comprising:
    odd-numbered field decode means for extracting picture data of the odd-numbered field from original picture signals so as to store the extracted picture data in the original picture storing means; and
    even-numbered field decode means for extracting picture data of the even-numbered field from the original picture signals so as to store the extracted picture data in the original picture storing means.

9. A picture size conversion method comprising the steps of:
    determining whether to thin out each of horizontal lines of original picture data with reference to a conversion table designating horizontal lines which are thinned out, wherein in one of an odd-numbered field and an even-numbered field, each of horizontal lines which are selectively thinned out in accordance with a reduction ratio is determined in advance; and
    converting the original picture data to converted picture data in such a way that the horizontal line which is determined to be thinned out is thinned out while the horizontal line which is determined not to be thinned out is stored in converted picture storing means.

10. A picture size conversion method according to claim 9 further comprising the step of:
    creating the conversion table based on the reduction ratio.

11. A picture size conversion method according to claim 10 further comprising the steps of:

if the reduction ratio is greater than 0 and is less than ½, thinning out all of the horizontal lines of the original picture data with respect to one field which is either the odd-numbered field or the even-numbered field; and converting the original picture data to the converted picture data in such a way that each of the horizontal lines of another field which are not thinned out is stored in the converted picture storing means.

12. A picture size conversion method according to claim 10 further comprising the step of:

if the reduction ratio is ½ or more but is less than 1, converting the original picture data to the converted picture data in such a way that all of the horizontal lines of the original picture data of one field, which is either the odd-numbered field or the even-numbered field, are not thinned out while each of the horizontal lines of another field which are not thinned out is stored in the converted picture storing means.

13. A picture size conversion method according to claim 12 further comprising the steps of:

making a decision as to whether filter process is required with respect to each of the horizontal lines which are not thinned out or not with reference to a correction position table;

storing the horizontal line which is not thinned out and for which the filter process is not required in the converted picture storing means; and performing the filter process on the horizontal line which is not thinned out and for which the filter process is required on the basis of one of upper and lower horizontal lines which are located above and below the horizontal line.

14. A picture size conversion method that performs picture size conversion on original pictures configured by frames each consisting of a first field and a second field in accordance with an interlaced display method, said picture size conversion method comprising the steps of:

creating a size conversion table in accordance with a reduction ratio which is designated in advance, wherein the size conversion table stores display flags each representing a decision whether to allow display of each of horizontal lines;

discriminating whether the reduction ratio belongs to a first range or a second range that is greater than the first range;

discriminating whether a horizontal line that is presently processed belongs to the first field or the second field;

thinning out the horizontal line that belongs to the first field if the reduction ratio belongs to the first range; and making a decision whether to thin out the horizontal line that belongs to the second field with reference to the size conversion table, whereby the original pictures are reduced in sizes in different ways in response to the first range and the second range of the reduction ratio respectively.

15. A picture size conversion method according to claim 14, wherein the first range designates that the reduction ratio is less than ½ while the second range designates that the reduction ratio is less than 1.

16. A picture size conversion method according to claim 14, wherein the first field corresponds to an even-numbered field while the second field corresponds to an odd-numbered field.

17. A picture size conversion method according to claim 14, wherein the horizontal line that belongs to the first field is not thinned out.

18. A picture size conversion method according to claim 14 further comprising the steps of:

creating a correction position table in accordance with the reduction ratio, wherein the correction position table stores correction flags each representing a decision whether to perform correction with respect to a horizontal line that belongs to the second field and that is not thinned out; and performing filter process as the correction on the horizontal line.

19. A picture size conversion device according to claim 3, wherein if the reduction ratio is ½ or more but is less than 1, the conversion table creation means creates the conversion table means in such a way that horizontal lines corresponding to one field, which is either the odd-numbered field and the even-numbered field, are not at all thinned out while horizontal lines corresponding to another field are selectively thinned out in accordance with the reduction ratio.

20. A picture size conversion device according to claim 3, wherein a converted picture size is designated, the conversion table creation means calculates the reduction ratio based on a picture display size of the original picture.

21. A picture size conversion device according to claim 4, wherein a converted picture size is designated, the conversion table creation means calculates the reduction ratio based on a picture display size of the original picture.

22. A picture size conversion device according to claim 5, wherein a converted picture size is designated, the conversion table creation means calculates the reduction ratio based on a picture display size of the original picture.

23. A picture size conversion device according to claim 6, wherein a converted picture size is designated, the conversion table creation means calculates the reduction ratio based on a picture display size of the original picture.

24. A picture size conversion device according to claim 3, further comprising:

odd-numbered field decode means for extracting picture data of the odd-numbered field from original picture signals so as to store the extracted picture data in the original picture storing means; and even-numbered field decode means for extracting picture data of the even-numbered field from the original picture signals so as to store the extracted picture data in the original picture storing means.

25. A picture size conversion device according to claim 4, further comprising:

odd-numbered field decode means for extracting picture data of the odd-numbered field from original picture signals so as to store the extracted picture data in the original picture storing means; and even-numbered field decode means for extracting picture data of the even-numbered field from the original picture signals so as to store the extracted picture data in the original picture storing means.

26. A picture size conversion device according to claim 5, further comprising:

odd-numbered field decode means for extracting picture data of the odd-numbered field from original picture signals so as to store the extracted picture data in the original picture storing means; and even-numbered field decode means for extracting picture data of the even-numbered field from the original picture signals so as to store the extracted picture data in the original picture storing means.

27. A picture size conversion device according to claim 6, further comprising:

odd-numbered field decode means for extracting picture data of the odd-numbered field from original picture signals so as to store the extracted picture data in the original picture storing means; and even-numbered field decode means for extracting picture data of the even-numbered field from the original picture signals so as to store the extracted picture data in the original picture storing means.

28. A picture size conversion method according to claim 11, further comprising the step of:

if the reduction ratio is ½ or more but is less than 1, converting the original picture data to the converted picture data in such a way that all of the horizontal lines of the original picture data of one field, which is either the odd-numbered field or the even-numbered field, are not thinned out while each of the horizontal lines of another field which are not thinned out is stored in the converted picture storing means.

* * * * *